(No Model.)
W. L. CHURCH.
ICE MAKING APPARATUS.
No. 533,035.  Patented Jan. 22, 1895.
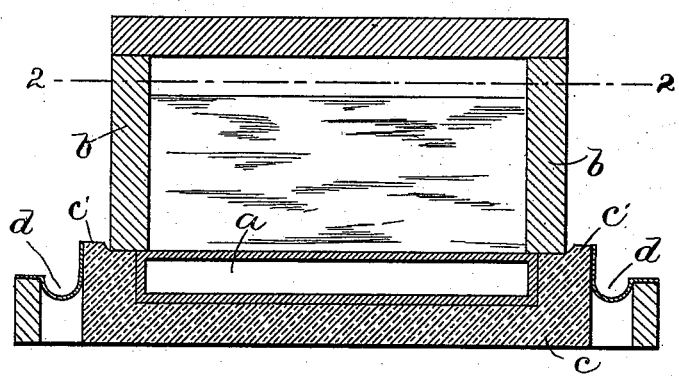
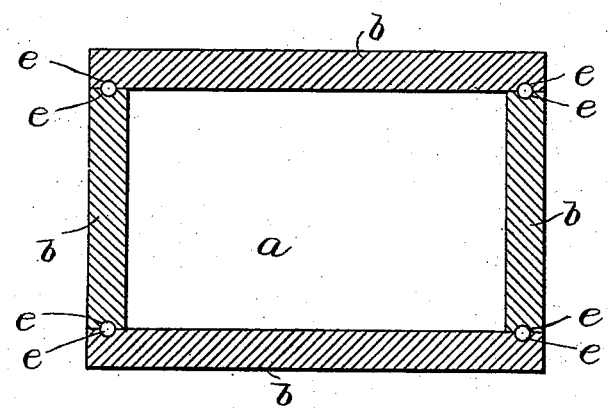
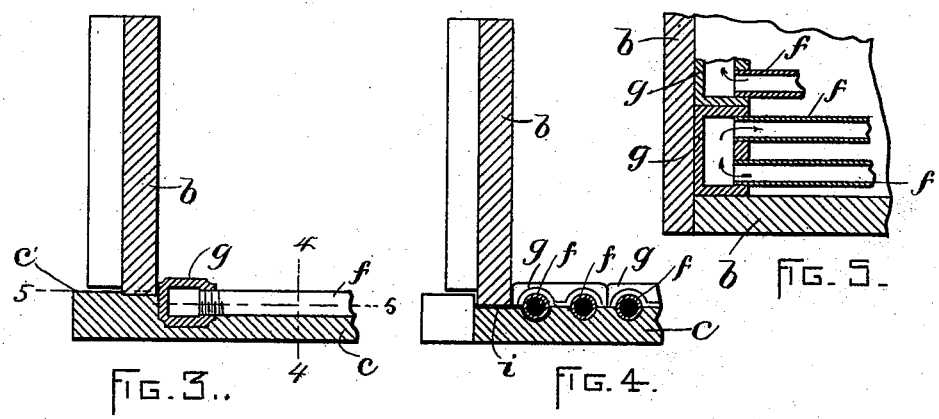
WITNESSES:
A. D. Harrison
Rollin Abell
INVENTOR:
Wm Lee Church
by Wight & Brown Horsley
Attys

UNITED STATES PATENT OFFICE.

WILLIAM LEE CHURCH, OF NEWTON, MASSACHUSETTS, ASSIGNOR TO THE WESTINGHOUSE, CHURCH, KERR & COMPANY, OF JERSEY CITY, NEW JERSEY, AND NEW YORK, N. Y.

ICE-MAKING APPARATUS.

SPECIFICATION forming part of Letters Patent No. 533,035, dated January 22, 1895.

Application filed March 17, 1894. Serial No. 504,049. (No model.)

*To all whom it may concern:*

Be it known that I, WILLIAM LEE CHURCH, of Newton, in the county of Middlesex and State of Massachusetts, have invented certain new and useful Improvements in Ice-Making Apparatus, of which the following is a specification.

This invention relates to a tank in which a body of sweet water is frozen by the action of a refrigerant contained in a bed or casing at the bottom of the tank, and particularly to tanks of this class in which the walls which confine the body of water and hold it in place over the bed are detachable from the bed to enable a cake of ice to be readily removed.

The invention has for its object, first, to enable a water-tight joint to be formed between the bed and the side pieces of the tank by the formation of ice.

The invention also has for its object to provide simple means for making the vertical joints at the corners of the tank water-tight.

To these ends, the invention consists in the improvements which I will now proceed to describe and claim.

Of the accompanying drawings, forming part of this specification,—Figure 1 represents a sectional view of an ice-making tank constructed in accordance with my invention. Fig. 2 represents a section on line 2—2 of Fig. 1. Fig. 3 represents a sectional view showing a different form of freezing bed. Fig. 4 represents a section on line 4—4 of Fig. 3. Fig. 5 represents a section on line 5—5 of Fig. 3.

The same letters of reference indicate the same parts in all the figures.

In the drawings—$a$ represents a freezing bed, which is shown in Fig. 1 as a casing of cast iron, said casing being provided with means for the introduction of a refrigerating agent, such as ammonia, which may be expanded into gas in the bed and thus caused to abstract heat from a body of water above the bed. The bed may be acted on in any other suitable way by a refrigerating agent, the method of refrigeration forming no part of my invention. Moreover, the bed may be of pipes instead of a continuous casing or hollow plate, in which case my invention is applied in a modified manner, as hereinafter shown.

$b\ b$ represent the vertical sides of the tank, said sides being arranged to confine a body of water above the bed and being detachable from the bed and from each other, so that after a cake of ice has been formed the sides of the tank may be removed. I prefer to make the walls $b$ of a waterproof material or composition which is a non-conductor of heat and is non-adhesive to ice, a suitable material being compressed wood pulp filled with a composition of paraffine, resin, and asphalt, and molded into slabs or pieces of suitable shape. The walls $b$ may, however, be made principally of wood, lined with sheets of non-conducting material which is non-adhesive to ice.

In carrying out my invention, when a continuous casing is used, as shown in Fig. 1, I arrange the walls $b$ so that their lower edges overlap the margin of the bed $a$, portions of said lower edges resting upon the upper surface of said bed, as shown in Fig. 1. This arrangement causes the conducting surface of the bed in contact with or overlapped by the walls $b$ to very quickly freeze the water which finds its way from the interior of the tank through the crevices between the bed and the lower edges of the walls, the freezing of said water tightly sealing the horizontal joints between the walls and the bed. As already stated, I prefer to arrange the walls $b$ so that they only partially overlap the marginal portions of the bed $a$, it being my object to avoid covering more of the active surface of the bed $a$ than is necessary to obtain the desired sealing of the joints by the ice. I therefore show in Fig. 1 the outer portions of the lower edges of the walls $b$ resting upon a supplemental bed $c$, which is preferably of a waterproof non-conducting material similar to that of which the walls $b$ are made, and is here shown as covering the bottom and vertical sides of the bed $a$.

The supplemental bed $c$ is preferably provided with a raised lip or wall $c'$ extending along the outer sides of the walls $b$, the object of said lip or wall being to furnish a dam to confine the water that first flows over the crevices between the walls b of the bed, so that by first introducing a small quantity of water into the tank, less than the quantity required to overflow the said dam, and freezing the water in the crevices before introducing more water, wasteful leakage through the horizontal crevices will be avoided.

In Fig. 1 I show gutters or conduits d surrounding the bed to receive any water that may escape from the tank by leakage, said gutters being provided with a suitable outlet through which the accumulated water may pass.

In Figs. 3, 4, and 5, I show a construction of freezing bed involving parallel pipes f which are connected at their ends by casings g, each casing connecting the ends of two pipes, and constituting the equivalent of a return bend, so that the series of pipes connecting the casings constitute a continuous conduit extended back and forth along the bottom of the tank. The pipes and casings may be supported on a bed c similar to that employed for supporting the bed or casing shown in Fig. 1, portions of the vertical sides of the casing g projecting above the said bed. The walls b in this case are arranged so that the lower portions of their vertical sides are in close proximity to the outer vertical sides of the casings g, as shown in Fig. 3, so that vertical crevices are formed, which receive water from the tank, said water being quickly frozen into a water-tight packing by the action of the refrigerant in the casings g.

As it is impracticable to cause the walls b to bear directly upon the outer pipes f of the series, I provide metal plates i which are in contact with said outer pipes and extend outwardly therefrom over the bed c far enough to come in contact with the lower edges of the walls b, as shown in Fig. 4. Said plates conduct heat from the water in the crevices between them and the walls b, thus causing the formation of ice packings in said crevices.

It will be seen, therefore, that I do not limit myself to direct contact between the freezing bed or its equivalent and the walls b, nor to the contact of said walls with horizontal portions of the freezing bed, as the walls may rest upon supplemental plates or extensions from the bed, as shown in Fig. 4, and may bear against or be in close proximity to vertical surfaces of the bed, as shown in Fig. 3.

It will be seen that by causing the separable walls of the tank or portions thereof to rest upon or closely adjoin the marginal portions of the bed, I provide for the quick and tight sealing of the horizontal joints of the tank.

To provide for the sealing of the vertical joints of the tank, or those joints that occur at the meeting faces of the walls b, I provide said meeting faces with grooves e (Fig. 2), which are adapted to form molds for a melted packing material, such as the composition of paraffine, resin, and asphalt above mentioned. I prefer to form a groove in that part of the surface of each wall b that meets or is in contact with a corresponding part of the surface of the adjoining wall, so that when the walls or wall-sections are assembled, pockets extending across the joints will be formed for the reception of said packing. As the above mentioned composition melts at a temperature below the boiling point of water, a supply for immediate use may be kept in an oil can submerged in a hot water bath. The melted material poured into said pockets fills the same, and subsequently hardening makes the joints water-tight, as will be readily seen. The pockets are preferably made of such form that the packings formed therein will not resist the separation of the sections. After the sections have been separated to permit the removal of the ice, the packing pieces will readily drop out and may be re-melted and the material used again.

Any suitable means may be employed for detachably connecting the walls b at their corners.

It will be observed that in each of the constructions shown the freezing-bed has acting or packing-creating surfaces of conducting metal, through which heat is conducted to the refrigerating agent within the bed, said acting surfaces being arranged so that they co-operate with the separable walls in forming thin crevices containing films of water which are quickly converted into films or packings of ice. In Fig. 1 the marginal portions of the top of the bed constitute the acting conducting surfaces. In Fig. 3, the said acting surfaces are the outer vertical sides of the casings or sectional headers g. In Fig. 4, the plates i constitute conducting extensions which, being in contact with the outer pipes f, constitute equivalents of the acting surfaces previously described.

It is obvious that an apparatus in which only one of the walls b is removable, the others being fixed, would embody the essential features of my invention, the removable wall presenting a portion of its surface to the corresponding acting surface of the bed, as above described.

I claim—

1. In an ice-making apparatus, an ice-shaping tank comprising a freezing-bed having an acting surface of conducting metal through which heat is conducted to the refrigerating agent within the bed, and a wall which is separable from the bed and presents a portion of its surface to the said acting surface of the bed, so that a film or packing of ice is quickly formed between the said surfaces.

2. In an ice-making apparatus, a freezing-bed composed of pipes or conduits and casings or sectional headers connecting the ends of said pipes, said casings presenting an exposed vertical face or acting surface, combined with a wall which is separable from said bed and presents a portion of its inner side to said acting surface.

3. In an ice-making apparatus, a freezing-bed composed of pipes or conduits connected at their ends, metal plates extending outwardly from the outer pipes and presenting conducting seats or acting surfaces, and walls which are separable from the bed and bear upon said acting surfaces.

4. In an ice-making apparatus, an ice-shaping tank comprising a freezing bed forming the bottom of the water space, and walls separably connected with each other and with the bed, said walls having grooves or pockets adapted to hold packing material in position to make their vertical joints water-tight.

5. In an ice-making apparatus, an ice-shaping tank comprising a freezing bed forming the bottom of the water space, and walls separably connected with each other and with the bed, said walls having coinciding grooves in their meeting surfaces adapted to receive melted material and form said material into joint packings.

In testimony whereof I have signed my name to this specification, in the presence of two subscribing witnesses, this 5th day of March, A. D. 1894.

WM. LEE CHURCH.

Witnesses:
 ISAAC H. DAVIS,
 WALTER B. TROWBRIDGE.